Sept. 28, 1937.    G. H. SELF    2,094,502
BEARING GUARD FOR FERTILIZER DRILLS
Original Filed May 11, 1936
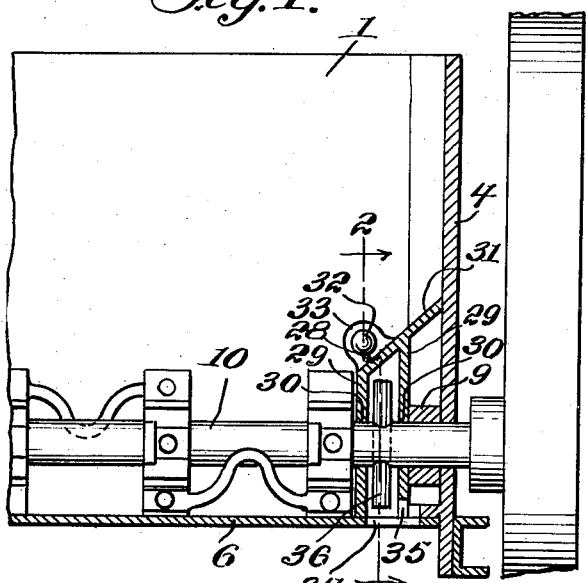
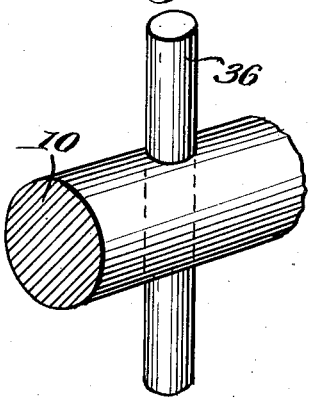
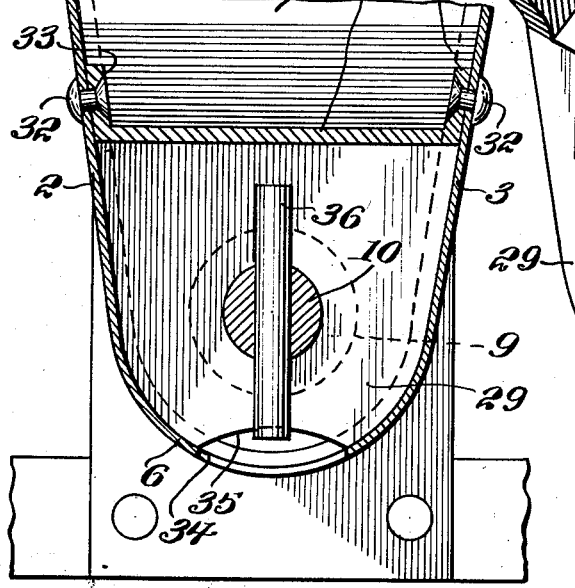
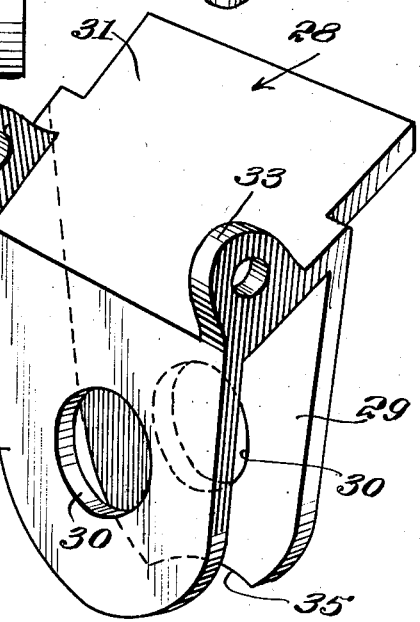
Grafton H. Self
INVENTOR
BY Victor J. Evans & Co.
ATTORNEYS
WITNESS J. L. Wright Patented Sept. 28, 1937

2,094,502

UNITED STATES PATENT OFFICE 2,094,502

BEARING GUARD FOR FERTILIZER DRILLS

Grafton H. Self, Twin Falls, Idaho

Original application May 11, 1936, Serial No. 79,136. Divided and this application March 22, 1937, Serial No. 132,389

3 Claims. (Cl. 286—5)

This invention relates to bearing guards for fertilizer drills and is a divisional application covering matter divided out from my co-pending application, entitled Fertilizer distributor, filed May 11, 1936, Serial No. 79,136.

An object of the invention is to provide a bearing guard in the form of an open box having an aperture to prevent foreign matter accumulating between bearing bosses and the end walls and web of a fertilizer drill hopper, the spaces between the side plates of the bearing guard being adapted to receive the rotating agitators of the axle shaft of the fertilizer drill and permit of the agitators ejecting from said space any fertilizer which may have found its way therein.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification.

Figure 1 is a longitudinal sectional view of a portion of a fertilizer drill hopper showing the axle shaft, a bearing for the shaft on the fertilizer hopper, and a bearing guard for the shaft bearing, constructed in accordance with the invention.

Figure 2 is a vertical section taken on the line 2—2 of Figure 1.

Figure 3 is a detail perspective view of the bearing guard.

Figure 4 is a fragmentary perspective view showing a portion of the axle shaft and one of the agitators for clearing the bearing guard.

Referring now to the drawing in which like characters of reference designate similar parts in the various views, the bearing guard 28 is in the form of an open box, comprising a pair of side plates 29 provided with bearing apertures 30 for receiving the axle shaft 10. A top plate 31 is disposed obliquely relatively to said side plates and projects beyond one of the plates, and said plates being of the proper edge contour and size to fit flush against the side walls 2 and 3 and the bottom wall 6 of the hopper 1.

One of these bearing guards is disposed at each outer end of the axle shaft 10, with one side plate 29 disposed flush against the bearing boss 9, and with the top plate 31 extending over the boss. The top plate 31 is so designed that in this position the outer edge thereof fits flush against the end wall 4 of the hopper 1.

The bearing guard is secured to the side walls 2 and 3 by means of bolts, rivets 32, or the like passing through perforated ears 33 formed on the top plate 31. The hopper 1 is provided in its bottom wall with an aperture 34 which communicates with the space between the side plates 29 of the bearing guard. One side plate of the bearing guard is cut or notched as shown at 35 to provide for the escape through the aperture 34, of any foreign matter accumulated between the bearing boss 9 and the end wall 4.

The axle shaft 10 is provided with radial studs 36 which form agitators that rotate in the space between the side plates 29 of the bearing guard and eject any fertilizer which may have found its way into said space.

From the above description it is thought that the construction and operation of the invention will be fully understood without further explanation.

What is claimed is:

1. A boxing for use as a bearing guard, comprising a pair of laterally spaced parallel plates provided with bearing openings, respectively, and a plate connecting the edges of said pair of plates on one side thereof, said connecting plate being oblique to the planes of the plates of said pairs and extending beyond the outer side of one of said plates, one of the plates of said pair having an edge notched therein opposite said connecting plate, and said connecting plate having a pair of opposed lugs extending from the outer face thereof.

2. In apparatus of the class described, a hopper having a bottom wall, and side and end walls, respectively, a shaft journaled in one end wall to extend along the bottom of the hopper, radial studs on the shaft, and a boxing surrounding said studs and shaft adjacent said end wall and comprising laterally spaced parallel side plates, and an oblique top plate, said boxing fitting into said hopper against the bottom, side and end walls, respectively, said studs preventing accumulation of foreign matter in the boxing.

3. In apparatus of the class described, a hopper having a bottom wall, side and end walls, respectively, and a bearing boss extending inwardly from one end wall, a shaft journaled in said boss to extend into said hopper, radial studs on the shaft adjacent said boss, and a boxing surrounding said shaft and said studs and comprising a pair of laterally spaced plates through which said shaft extends and fitting flush within the bottom of the hopper with their edges engaging the bottom and side walls thereof, a top plate connecting said pair of plates and extending upwardly and outwardly of said boss into engagement with said end wall, the bottom wall of the hopper being provided with an aperture communicating with the space between the plates of said pair and permitting escape of foreign matter which may be agitated by said studs.

GRAFTON H. SELF.